US 8,443,370 B2

(12) United States Patent
Smith et al.

(10) Patent No.: US 8,443,370 B2
(45) Date of Patent: May 14, 2013

(54) METHOD OF ASSIGNING RESOURCES TO FULFILL A SERVICE REQUEST BY A PROGRAMMING MODEL ABSTRACTION LAYER AT A DATA CENTER BASED AT LEAST IN PART ON A REFERENCE OF THE REQUESTED RESOURCE CLASS INDICATIVE OF AN ABSTRACT AMOUNT OF RESOURCES

(75) Inventors: Burton J Smith, Seattle, WA (US); James R Hamilton, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1018 days.

(21) Appl. No.: 12/198,784

(22) Filed: Aug. 26, 2008

(65) Prior Publication Data

US 2010/0058347 A1  Mar. 4, 2010

(51) Int. Cl.
G06F 9/46 (2006.01)
G06F 9/455 (2006.01)

(52) U.S. Cl.
USPC ............................................. 718/104; 718/1

(58) Field of Classification Search .................. 718/104, 718/1
See application file for complete search history.

(56) References Cited

U.S. PATENT DOCUMENTS

| | | | |
|---|---|---|---|
| 6,366,945 B1 * | 4/2002 | Fong et al. ..................... | 718/104 |
| 6,393,341 B1 | 5/2002 | Lawrence et al. | |
| 7,181,519 B2 | 2/2007 | Pillai et al. | |
| 2003/0074407 A1 | 4/2003 | Zhang et al. | |
| 2003/0149685 A1 * | 8/2003 | Trossman et al. ................. | 707/2 |
| 2004/0073673 A1 | 4/2004 | Santos et al. | |
| 2005/0044301 A1 * | 2/2005 | Vasilevsky et al. ............... | 711/1 |
| 2005/0131982 A1 | 6/2005 | Yamasaki et al. | |
| 2006/0069774 A1 | 3/2006 | Chen et al. | |
| 2006/0143617 A1 * | 6/2006 | Knauerhase et al. .......... | 718/104 |
| 2006/0184937 A1 | 8/2006 | Abels et al. | |
| 2006/0209695 A1 * | 9/2006 | Archer et al. .................. | 370/235 |
| 2007/0067435 A1 | 3/2007 | Landis et al. | |
| 2007/0118564 A1 | 5/2007 | Qi et al. | |

FOREIGN PATENT DOCUMENTS

| | | |
|---|---|---|
| CN | 1333508 | 1/2002 |
| CN | 1416249 | 5/2003 |
| CN | 1432248 | 7/2003 |

(Continued)

OTHER PUBLICATIONS

"HP Virtual Server Environment Reference Architecture for Oracle RAC", at <<http://h71028.www7.hp.com/ERC/downloads/4AA0-5671ENW.pdf>>, Hewlett-Packard Development Company, 2006, pp. 4.

(Continued)

Primary Examiner — Thomas Lee
Assistant Examiner — Terrell Johnson
(74) Attorney, Agent, or Firm — Lee & Hayes, PLLC

(57) ABSTRACT

An exemplary method includes hosting a service at a data center, the service relying on at least one software component developed according to a programming model and the data center comprising a corresponding programming model abstraction layer that abstracts resources of the data center; receiving a request for the service; and in response to the request, assigning at least some of the resources of the data center to the service to allow for fulfilling the request wherein the programming model abstraction layer performs the assigning based in part on reference to a resource class in the at least one software component, the resource class modifiable to account for changes in one or more resources of the data center. Various other devices, systems and methods are also described.

21 Claims, 8 Drawing Sheets

FOREIGN PATENT DOCUMENTS

| | | |
|---|---|---|
| CN | 1602468 | 3/2005 |
| CN | 101015171 | 8/2007 |
| CN | 101137984 | 3/2008 |
| CN | 101171858 | 4/2008 |
| WO | WO2007068602 A2 | 6/2007 |

OTHER PUBLICATIONS

"Integrating Virtual Machines into the Cisco Data Center Architecture", at <<http://www.cisco.com/univercd/cc/td/doc/solution/vmware.pdf>>, Cisco Systems, Inc., 2006, pp. 28.

Pike, et al., "Management by Contract in the Virtual Data Center", at <<http://www.dell.com/downloads/global/vectors/ps2q06-20060250-Abels-OE.pdf>>, Dell Inc., May 2006, pp. 4.

The Chinese Office Action mailed Aug. 28, 2012 for Chinese patent application No. 200980134130.1, a counterpart foreign application of U.S. Appl. No. 12/198,784, 10 pages.

The Extended European Search Report mailed Jul. 5, 2012 for European patent application No. 09811908.4, 7 pages.

The Chinese Office Action mailed Jan. 7, 2013 for Chinese patent application No. 200980134130.1, a counterpart foreign application of U.S. Appl. No. 12/198,784, 11 pages.

* cited by examiner

METHOD OF ASSIGNING RESOURCES TO FULFILL A SERVICE REQUEST BY A PROGRAMMING MODEL ABSTRACTION LAYER AT A DATA CENTER BASED AT LEAST IN PART ON A REFERENCE OF THE REQUESTED RESOURCE CLASS INDICATIVE OF AN ABSTRACT AMOUNT OF RESOURCES

BACKGROUND

Large scale data centers are a relatively new human artifact, and their organization and structure has evolved rapidly as the commercial opportunities they provide has expanded. Typical modern data centers are organized collections of clusters of hardware running collections of standard software packages, such as web servers database servers, etc., interconnected by high speed networking, routers, and firewalls. The task of organizing these machines, optimizing their configuration, debugging errors in their configuration, and installing and uninstalling software on the constituent machines is largely left to human operators.

Web services (e.g., software as a service "SaaS") supported by data centers are also rapidly evolving (for example, a company might first offer a search service, and then an email service, and then a Map service, etc.). Such services rely on applications that are distributed to and hosted by one or more data centers. A service operator and a data center operator typically enter into an agreement for specific hardware resources (e.g., number of processors, disk space, memory, bandwidth, etc.). A typically arrangement dedicates a certain number of servers and disk space to the service in a manner where the applications that provide the service "live" on the dedicated servers. When conditions change, this type of arrangement incurs a significant management overhead for the data center and service operators. For example, a data center operator may upgrade various hardware components that affect execution of the service's applications. In such an example, hardware changes can generate ripples that force the service operator to revise or redevelop its applications to account for the changes to thereby ensure an acceptable level of service to the service's end users.

Various exemplary technologies described herein pertain to architectures and programming models that can facilitate application development, hosting and performance.

SUMMARY

An exemplary method includes hosting a service at a data center, the service relying on at least one software component developed according to a programming model and the data center comprising a corresponding programming model abstraction layer that abstracts resources of the data center; receiving a request for the service; and in response to the request, assigning at least some of the resources of the data center to the service to allow for fulfilling the request wherein the programming model abstraction layer performs the assigning based in part on reference to a resource class in the at least one software component, the resource class modifiable to account for changes in one or more resources of the data center. Various other devices, systems and methods are also described.

DESCRIPTION OF DRAWINGS

Non-limiting and non-exhaustive examples are described with reference to the following figures.

DETAILED DESCRIPTION

An exemplary programming model allows a developer to develop applications (e.g., for Web services) that target a programming model abstraction layer of a data center. Such a programming model abstraction layer can supervise execution of the application using data center resources. Accordingly, a developer can develop applications to be hosted by a data center without having to know certain specifics about the data center's servers, storage devices, etc.

As described herein an exemplary programming model and associated abstraction layer abstract data center resources and thereby insulate application developers from various aspects of data center resources and their operation, maintenance, etc. Such a system can also facilitate negotiations between service and data center operators, enhance quality of service and reduce costs.

Figure 1:
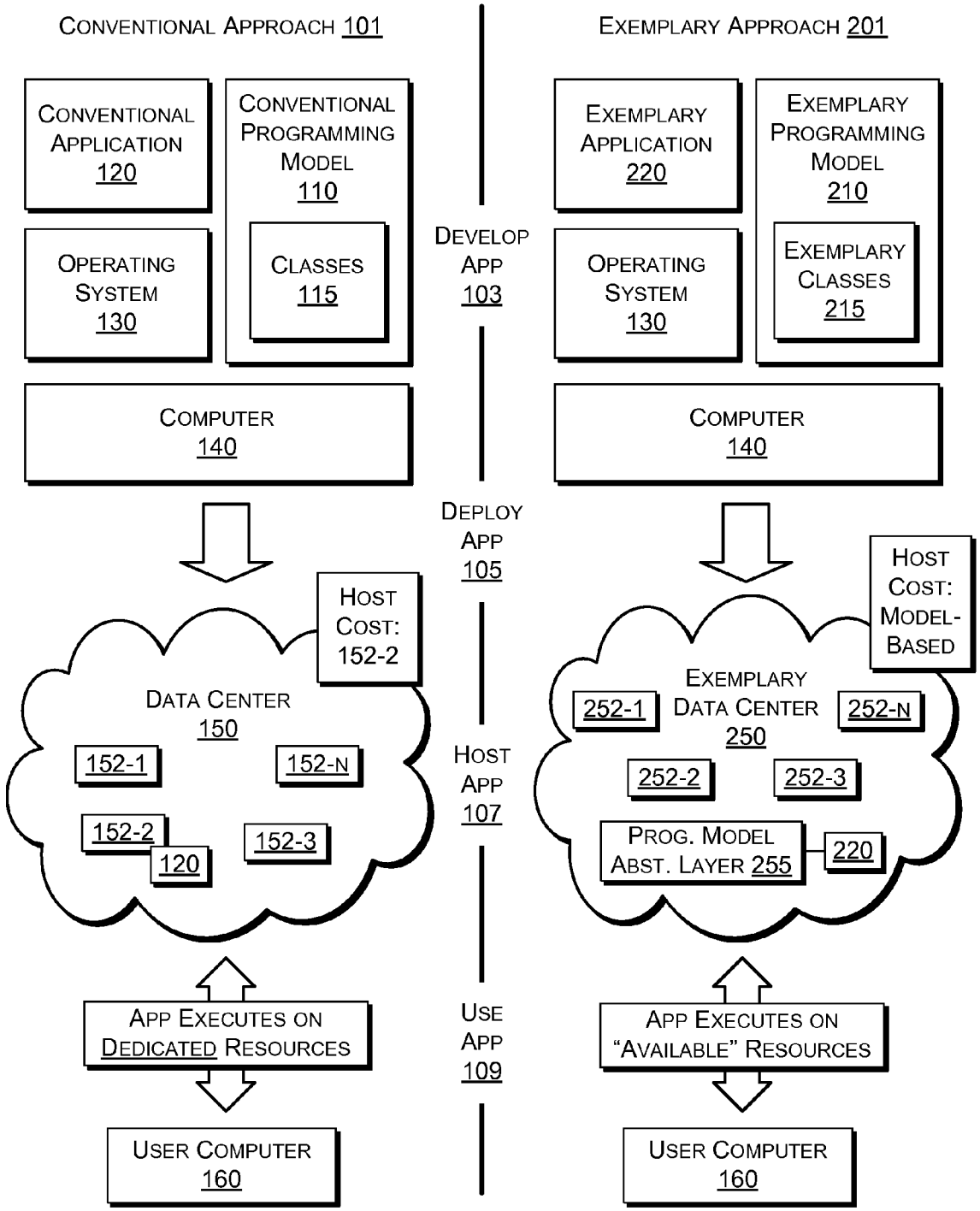
FIG. 1 is a block diagram of a conventional approach to application development, deployment and hosting and an exemplary approach that includes a programming model and a corresponding abstraction layer for abstracting resources of a data center.

FIG. 1 shows a conventional approach 101 and an exemplary approach 201 for a hosted service. Each of these approaches is described with respect to an application development stage 103, an application deployment stage 105, an application hosting stage 107 and an application usage stage 109.

For the conventional approach 101, in the development stage 103, a developer selects and develops an application 120 according to a programming model 110. As shown, the programming model 110 includes various classes 115 that may be relied on to perform specific functions in the developed application 120. The classes 115 may target an operating system (OS) 130 that operates a computer 140. As an alternative, the classes 115 may target a runtime engine or virtual machine, which is a software layer that may exist between the application 120 and the OS 130.

In a deployment stage 105, a service operator deploys the developed application 120 to a data center 150. As shown, the data center 150 includes various resources 152-1, 152-2, ..., 152-n. During the deployment stage 105, a data center operator typically assigns the application 120 to specific resources. As indicated, in the hosting stage 107, the dedicated resources 152-2 host the application 120.

Once hosted, in a usage stage 109, a user may request use of the application (i.e., a service) via a user computer 160. Upon receipt of the request by the data center 150, the request is satisfied by execution of the application 120 on the dedicated resources 152-2.

As indicated by a "Host Cost" block, in the conventional approach 101, the service operator is billed for use of the resources 152-2, which are exclusively reserved for the service.

In the conventional approach 101, if the data center operator performs a hardware upgrade that impacts the resources 152-2, then the impact of this change may be felt by the service operator. For example, if the data center operator upgrades server hardware and/or software, the application 120 may not execute properly or as efficiently as possible. In such a situation, the service operator may not be informed directly by the data center operator of faults or delays in service to end users. Instead, the service operator may receive complaints from disgruntled end users. In turn, the service operator may complain to the data center operator and thereby stress the relationship and even call for renegotiation of host costs or assert allegations of breach of contract. While a service level agreement between the service operator and the data center operator may account for service disruptions due to upgrades, ultimately, the goal of both parties is to provide acceptable service.

In contrast, the exemplary approach 201 relies on an exemplary programming model 210 and associated programming model abstraction layer 255 that shift various roles and duties to a data center operator with a concomitant obligation placed on a service provider. As shown in FIG. 1, in the development stage 103, a developer develops an exemplary application 220 using an exemplary programming model 210 while in the deployment, hosting and usage stages 105, 107 and 109, an exemplary data center 250 relies on the programming model abstraction layer 255 to manage resources for the application 220.

In the exemplary approach 201, the programming model 210 includes classes 215 that can be appropriated placed in application code for the application 220. The classes 215 include various classes specific to resource management by the programming model abstraction layer 255. For example, the classes 215 may include a cost class that limits a cost per unit time, a CPU class that sets a minimum amount of CPU power per request, a memory class that sets a minimum amount of RAM per request, etc. Hence, the programming model 210 may include one or more classes amongst the classes 215 that set some requirements on a per request basis. As the number of requests may change or be unknown, this approach allows the service operator and the data center operator some flexibility in negotiations, i.e., such an approach can alleviate the need to dedicate resources to a service operator.

As described herein, classes specific to management of the application 220 in the data center 250 may be centralized (e.g., appear as a particular section of code) or distributed throughout the code for the application 220. Further, such classes may be relied on once (e.g., during an initial assessment by the abstraction layer 255) or multiple times (e.g., periodically or whenever conditions change in the data center 250). For example, a portion of code for the application 220 may call for specific functionality followed by a statement that references a resource class, in the set of classes 215, which, for example, specifies an approximate memory for the functionality given a typical user request.

In the deployment stage 105, upon receipt of the application 220, the programming model abstraction layer 255 may execute all statements for resource classes to determine or estimate resource requirements and nature of resources required responsive to each user request. Such an analysis may also help the data center operator determine a cost for hosting the application 220, as indicated by the "Host Cost" block, which refers to a "model-based" cost approach.

In a hosting stage 107, the programming model abstraction layer 255 may rely on resource classes to assign hosting characteristics to the application 220. In a usage stage 109, as there may be no requirement to host the application 220 on specific dedicated resources in the data center 250, the hosting characteristics may be relied on when a request is received by the data center 250 to thereby provide "available" resources for execution of the application 220 to meet the request. Depending on the hosting characteristics, the "available" resources may be low cost, high cost, etc., resources that meet expectations of the service operator (e.g., as programmed directly into the code during the development stage 103). In such an example, the "available" resources may be determined by the data center operator which allows more flexibility in management of resources (e.g., for lowest cost, for maintenance, etc.).

In the usage stage 109, during actual execution of the application 220, resource statements may be ignored or occasionally tagged and benchmarked against actual resource demand. The programming model abstraction layer 255 may store such information in a log for use in managing the application 220 or in managing one or more other applications.

Overall, the exemplary approach 201 allows a data center operator to manage its obligations with respect to a service without necessarily being bound by the conventional, inflexible dedicated resource approach 101.

Figure 2:
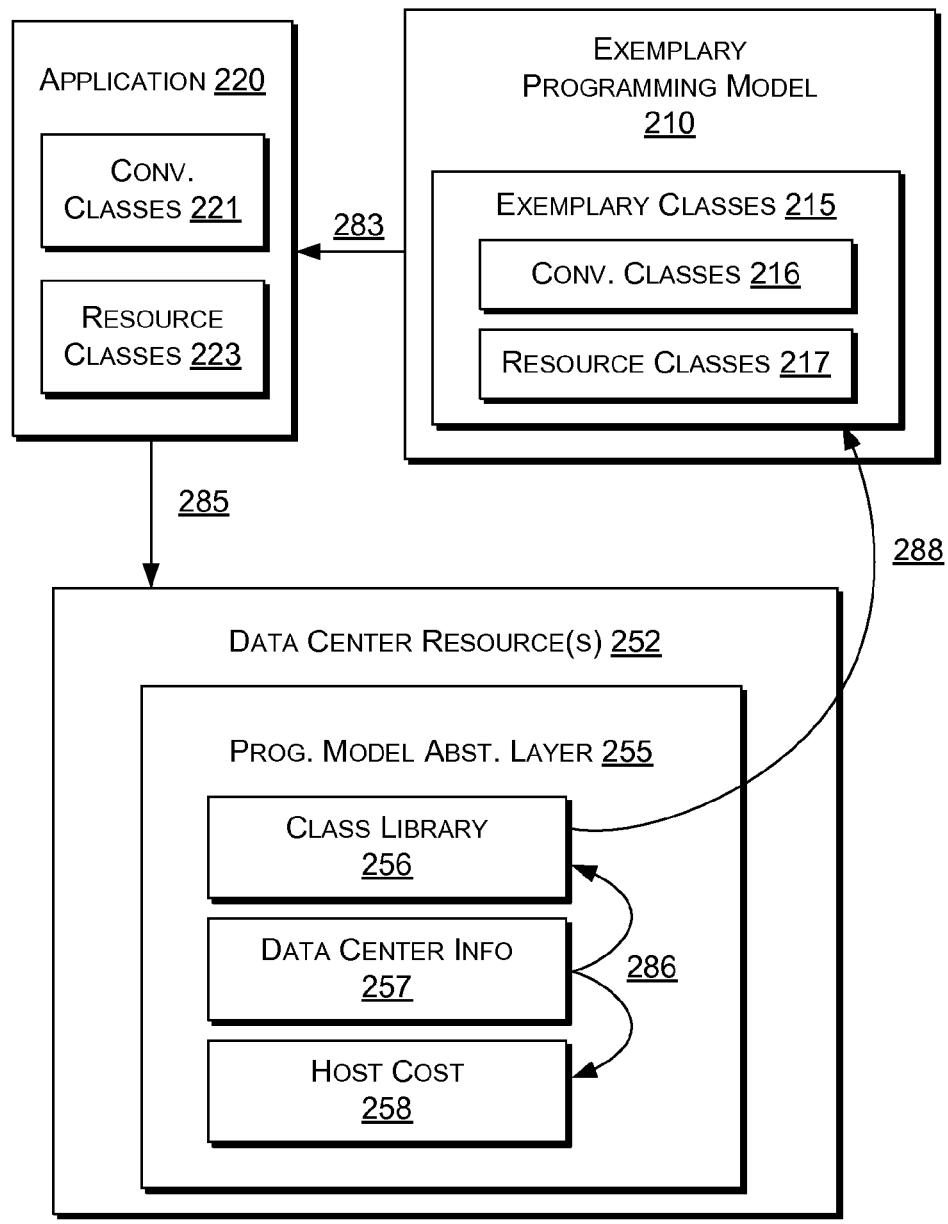
FIG. 2 is a block diagram of an exemplary architecture for a programming model and corresponding abstraction layer for abstracting resources of a data center.

FIG. 2 shows an exemplary architecture 280 for the programming model 210 and the abstraction layer 255 of FIG. 1. The programming model 210 include classes 215, which further include conventional classes 216 and resource classes 217. In a building or developing step 283, the application 220 is built according to the programming model 210 and includes statements for conventional classes 221 and statements for resource classes 223. In a deployment step 285, the application 220 is deployed to a data center that includes data center resources 252 where at least some resources support the programming model abstraction layer 255. As shown in the example of FIG. 2, the programming model abstraction layer 255 includes a class library module 256, a data center information module 257 and a host cost module 258. In a propagation step 286, the data center information module 257 acts to propagate important data center information to the class library module 256 and/or the host cost module 258. In turn, if the class library module 256 determines that upgrades are required (e.g., revisions, additions, etc.) to the classes 215 in the programming model 210, then such changes are made to ensure that the programming model 210 remains valid for the programming model abstraction layer 252 and its underlying data center resources.

As described herein, an exemplary method can include hosting a service at a data center, the service relying on at least one software component developed according to a programming model and the data center comprising a corresponding programming model abstraction layer that abstracts resources of the data center (see, e.g., the programming model 210, the application 220, the data center 250 and the abstraction layer 255 of FIG. 1); receiving a request for the service (see, e.g., the usage stage 109 of FIG. 1); and, in response to the request, assigning at least some of the resources of the data center to the service to allow for fulfilling the request where the programming model abstraction layer performs the assigning based in part on reference to a resource class in the at least one software component, the resource class modifiable to account for changes in one or more resources of the data center (see, e.g., the classes 215 of the programming model 210 of FIG. 1). For example, the resource class may be a processor resource class, a memory resource class, a bandwidth resource class or a class for another type of resource.

As described in more detail below, a programming model abstraction layer may consider available resources in a data center, as of a time of receipt of the request, when assigning resources to fulfill the request. In various examples, at least some of the resources assigned in response to a first request for a service may differ from resources assigned in response to a second request for the service. For example, such a difference may depend on resource utilization in the data center at the first time and at the second time. Further, such a difference may be in actual resources, virtual resources or actual and virtual resources.

As mentioned, an exemplary programming model and programming model abstraction layer can insulate services from changes to resources. For example, instead of revising code for the service, a data center operator may modify a resource class based on a change to a hardware resource or other resource of the data center. In such a manner, code for the service (e.g., a software component of the service) can execute using, in part, the changed hardware resource or other resource without requiring any modification. This approach can effectively relieve a service operator from having to deal with changes to data center resources. For example, an exemplary programming model and programming model abstraction layer approach can insulate a software component of a service from a change in number of servers in the data center, from a change in type of processors in the data center, etc.

As described herein, an exemplary method can include providing a resource class for use in assigning a type of physical resource to a service hosted by a data center in response to a request for the service; executing a software component using the type of physical resource; changing a characteristic of the type of physical resource; modifying the resource class; and executing the software component using the changed type of physical resource wherein the modifying the resource class insulates the software component from the changing.

As described further below, a service may rely on another service hosted by the data center or even externally hosted. In such situations, a service level agreement may exist for the other service. An exemplary method can include performing event tracing during execution of the other service to collect information sufficient to determine if the other service complied with one or more terms of the service level agreement. While event tracing is mentioned with respect to service level agreements, it may be used in one or more other contexts as well (e.g., according to one or more statements in a software component of a service).

The exemplary approach 201 of FIG. 1 may be considered an architecture for a service where the architecture includes a programming model and a corresponding programming model abstraction layer for implementation by a data center; and a service developed according to the programming model and hosted by the data center where the programming model abstraction layer assigns at least some resources of the data center to the service in response to a request for the service, for example, based in part on reference to a resource class in at least one software component of the service, the resource class modifiable to account for changes in one or more resources of the data center.

Figure 3:
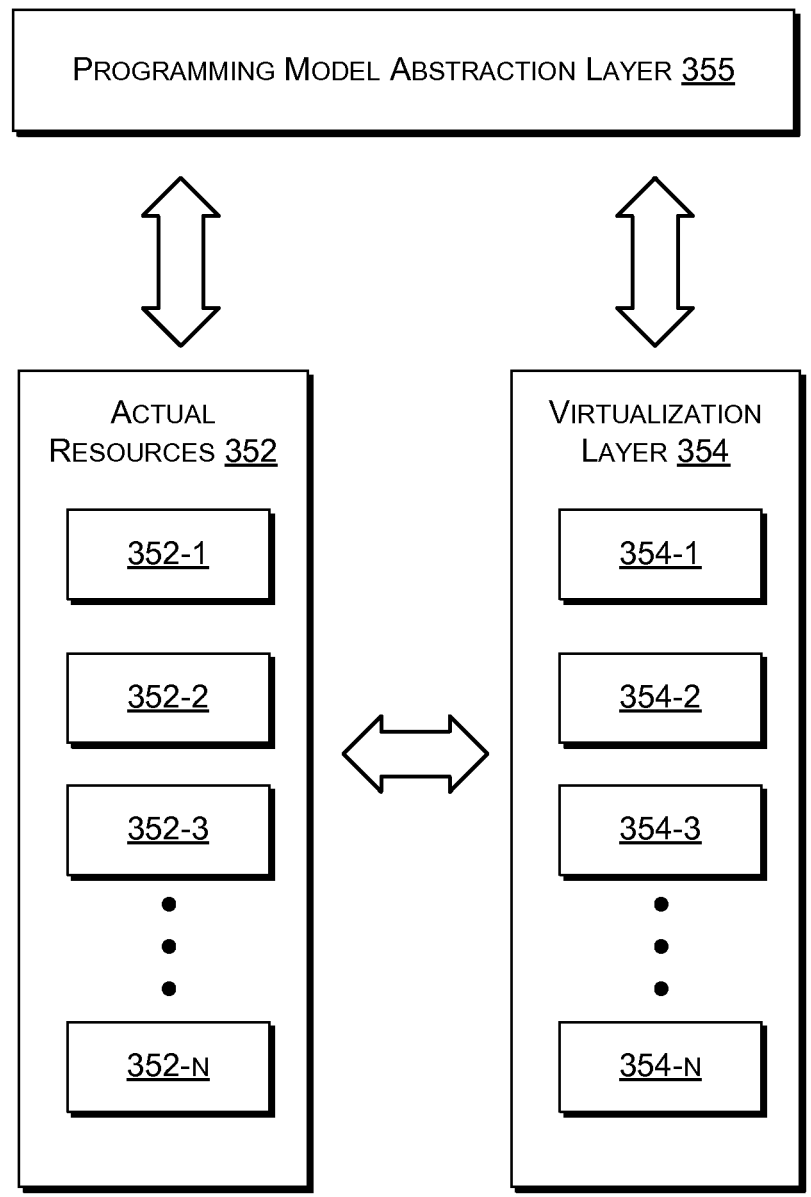
FIG. 3 is a block diagram of exemplary programming model abstraction layer and actual, physical resources and a virtualization layer that represents virtual resources in a data center.

FIG. 3 shows an exemplary arrangement 300 whereby a programming model abstraction layer 355 can interface with actual resources 352 and/or a virtualization layer that relies on actual resources 354. The virtualization layer 354 can operate one or more virtual machines or other virtual resources that rely on one or more of the actual resources 352. For example, the programming model abstraction layer 355 may instantiate one or more virtual machines to execute an application in response to a request. In another example, the programming model abstraction layer 355 may satisfy a request by managing at least some actual resources 352 directly and by additionally managing actual resources 352 indirectly via a virtualization layer 354.

Figure 4:
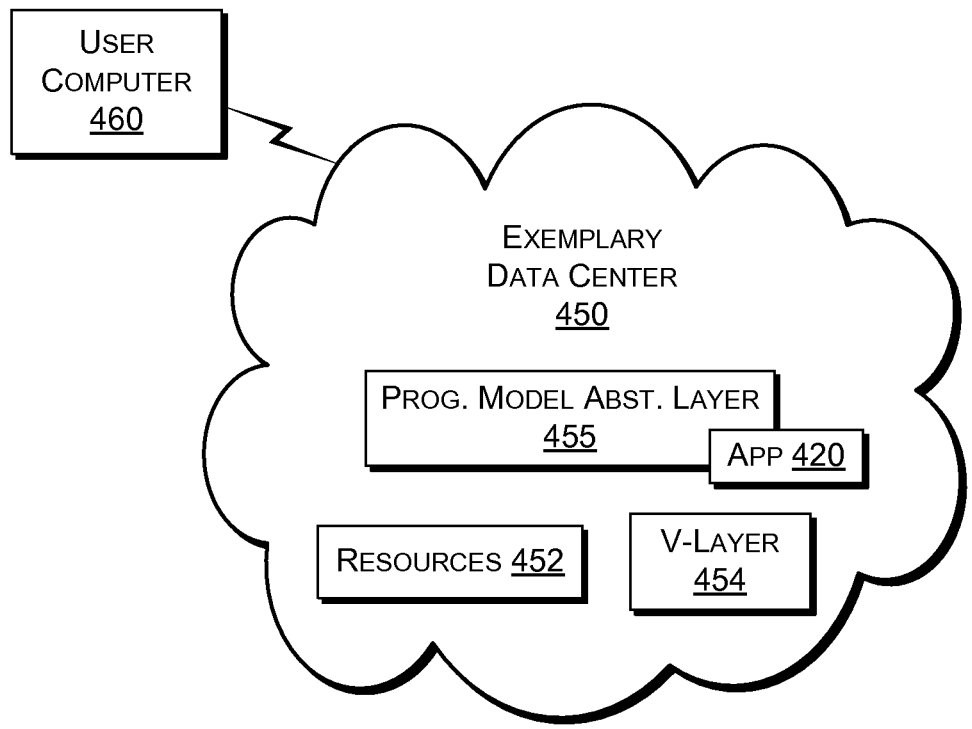
FIG. 4 is a block diagram of an exemplary technique for assigning resources to fulfill a request for a service based in part on availability of resources, for example, at the time a request is received.
Figure 4:
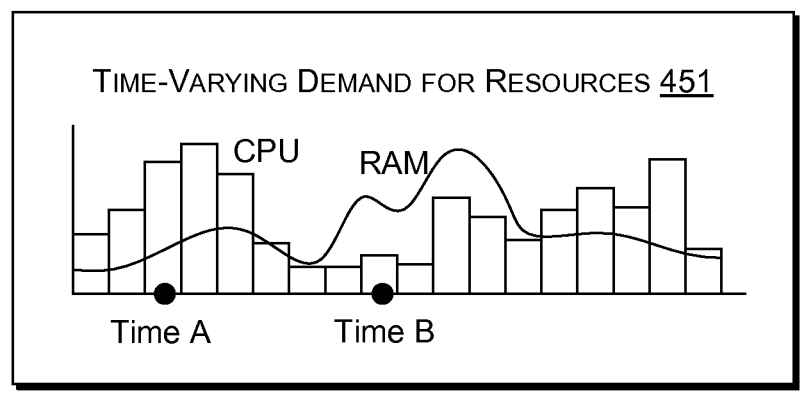

FIG. 4 shows an exemplary data center 450 with fluctuation in demand for resources. In the example of FIG. 4, a plot 451 shows time-varying demand for CPU and RAM resources, which do not necessarily vary in a similar manner with respect to time. The plot 451 identifies two times: Time A and Time B. At Time A, the CPU demand is high while the RAM demand is moderate whereas at Time B, the CPU demand is low while the RAM demand is relatively high. An exemplary programming model abstraction layer 455 of the data center 450 can assign resources to requests in a manner that accounts for current demand of the resources. Consider a user computer 460 issuing a request for an application 420 hosted by the data center 450. As shown in an assignment block 490, at Time A, the programming model abstraction layer 455 assigns the application 420 a blade 452-4 and a virtual machine 454-4; whereas, at Time B, the programming model abstraction layer 455 assigns the application 420 three blades 452-2, 452-3, and 452-4. Accordingly, where RAM usage is low, then the programming model abstraction layer 451 may decide to rely more on the virtualization layer 454; whereas, when RAM usage is higher and CPU usage low, the programming model abstraction layer 451 may decide to rely more on actual hardware (e.g., blades).

Figure 5:
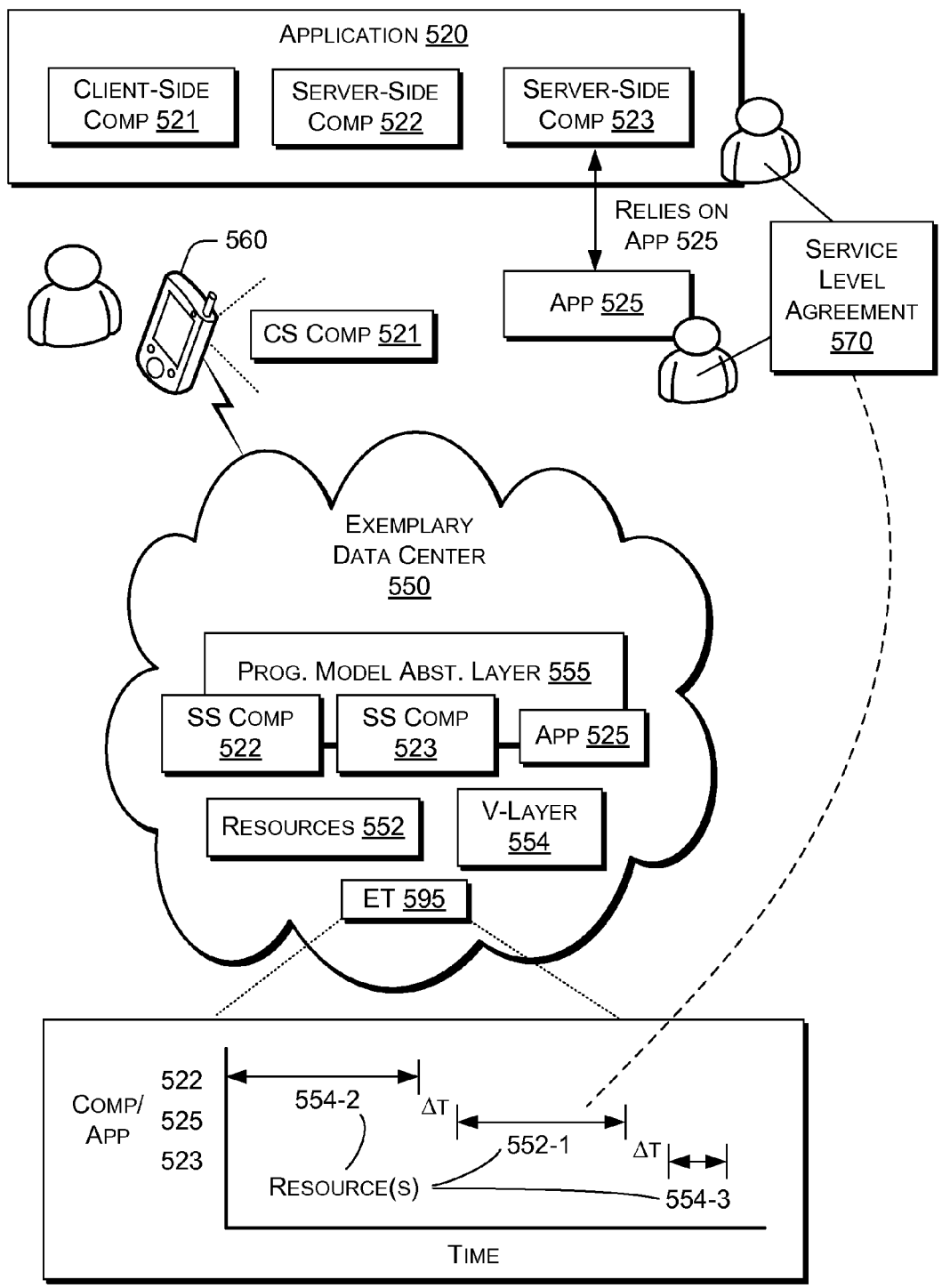
FIG. 5 is a block diagram of an exemplary scheme that includes multiple services, a service level agreement and event tracing.

FIG. 5 shows an exemplary scenario where an application 520 depends on another application or service 525. In this example, the application 520 includes a client-side component 521, a server-side component 522 and a server-side component 523, which relies on an application 525. As indicated, a service level agreement 570 exists between the developer of the application 520 (e.g., owner of service provided by the application 520) and the developer of the application 525 (e.g., owner of service provided by the application 525). The service level agreement 570 typically specifies minimum standards for the application 525 for certain conditions and a royalty for usage of the application 525. The application 525 may be considered an on-demand application or service that provides some functionality (e.g., GPS information) that other applications can integrate into a services bundle.

As shown in the example of FIG. 5, the two server-side components 522 and 523 of the application 520 are hosted by the data center 550 and registered with the programming model abstraction layer 555. Further, the application 525 is hosted by the data center 550 and registered with the programming model abstraction layer 555. Hence, the programming model abstraction layer 555 may already be aware of a relationship between the application 520 and the application 525.

Also included in the data center 550 is a event tracing (ET) module 595, which may rely on various hardware and/or software to trace events in the data center 550. For example, the ET module 595 may communicate with the resources 552 and/or the virtualization layer 554 to gather information as to an order of events for a given request. Consider a user issuing a request from the client-side component 521 of the application 520 via the user device 560. Upon receipt of the issued request by the programming model abstraction layer 555, resources are assigned to allow for execution of the components 522 and 523 as well as the application 525. The programming model abstraction layer 555 may be aware of the service level agreement for the application 525 and take this into account when assigning resources (e.g., to ensure compliance with the SLA 570).

As indicated by an event plot of component/application versus time, based on data collected by the event tracing module 595, the component 522 executed first using assigned virtual layer resource 554-2, followed by execution of the application 525 using assigned actual resource 552-1, which was followed by execution of the component 523 using assigned virtual layer resource 554-3. Between each of these executions, a time gap exists that represents, or at least includes, a communication time for communication of information (e.g., from one component/application to another).

As the service provided by the application 525 may be requested more frequently than the components 522 and 523, the programming model abstraction layer 555 may treat it differently than the components 522 and 523. For example, the application 525 may be deemed to have characteristics that bias its assignment to more persistent, actual resources 552 as opposed to virtual layer resources 554, which may be created and destroyed on an as needed basis. Where the application 525 relies on external input such as a satellite system, then certain actual resources 552 may be permanently linked to the external input and form a set of resources that can execute the application 525.

As may be appreciated, where applications (or components) are interdependent, the programming model abstraction layer 555 may account for such interdependencies and call for event tracing using one or more event tracing modules 595. Event tracing information may be further used to determine whether a service level agreement has been met. In an exemplary programming model, classes optionally include one or more classes that call for event tracing. Such event tracing may be occur independent of a programming model abstraction layer or may be managed by a programming model abstraction layer. While event tracing introduces some amount of overhead, the information gathered can be used for any of a variety of beneficial purposes to improve a system (e.g., to improve performance, troubleshoot, lower cost, validate service level, etc.).

Figure 6:
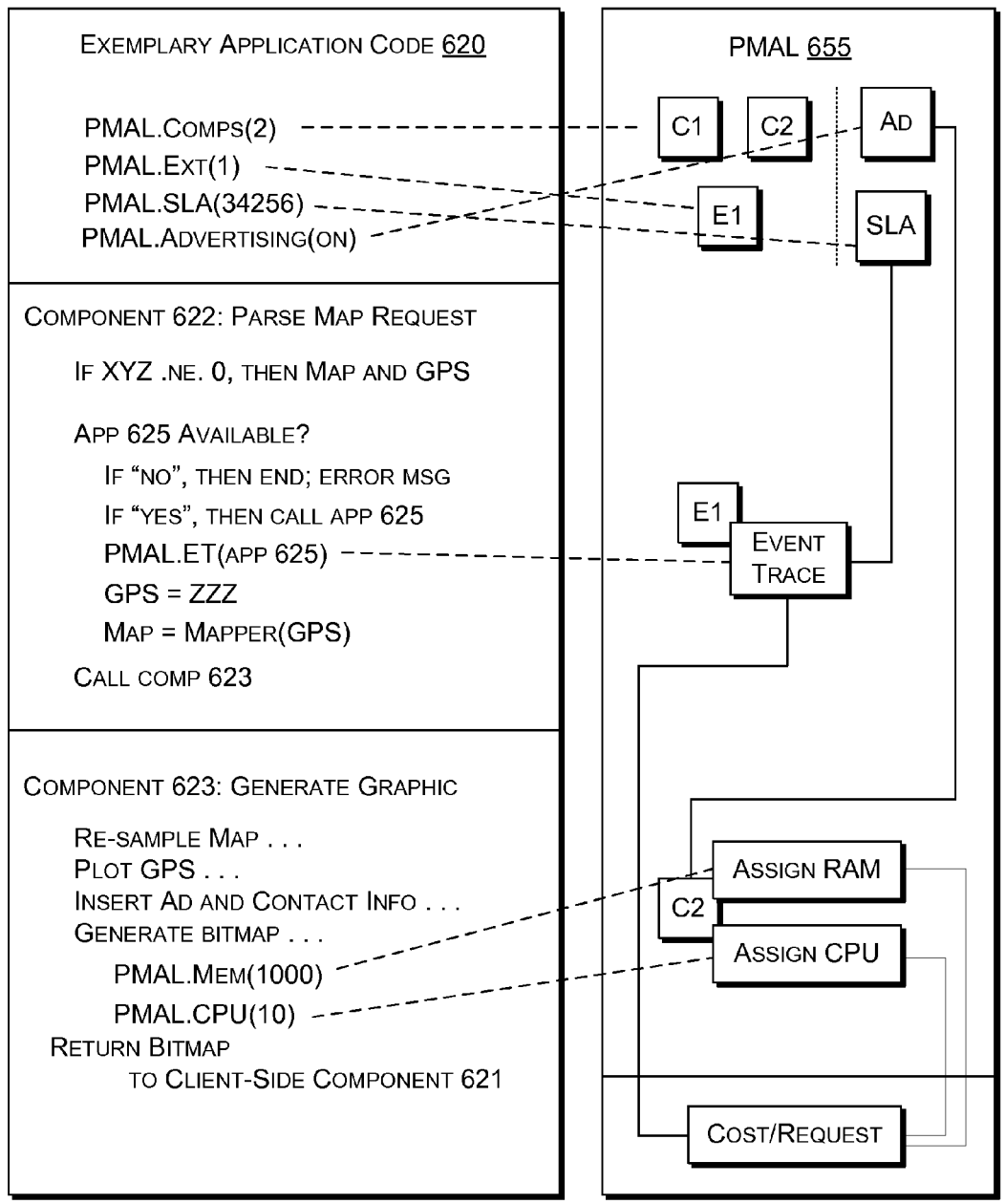
FIG. 6 is a block diagram of an approximate logical representation application code and a programming model abstraction layer that references resource classes and event tracing.

FIG. 6 shows exemplary application code 620 and a corresponding programming model abstraction layer (PMAL) 655. The code 620 is an approximate logical representation of some code that could be used to implement a service such as a mapping service for a mobile computing device like the device 560 of FIG. 5. The code 620 includes a PMAL portion that relies on programming model classes that relate generally to resources in a data center or otherwise accessible via a data center (see, e.g., the resource classes 217 of FIG. 2). In the example of FIG. 6, the code 620 references a class PMAL. Comps, which indicates the number of components, if known; a class PMAL.Ext, which indicates the number of external applications or services relied on by the code 620; a class PMAL.SLA, which indicates that the code 620 operates, at least in part, according to a service level agreement and; a class PMAL.Advertising, which indicates that the application code 620 can include advertising. As described herein, advertising may help off-set costs associated with hosting and execution of the code 620 at a data center that operates using the PMAL 655.

The code 620 includes two components 622 and 623. The component 622 parses a map request as received from a user via a user device that may have a client-side component 621 installed. The component 622 performs various tasks including calling an external application 625. As the SLA (ID 34256) pertains to use of the external application 625, the developer of the application code 620 has inserted a PMAL.ET statement that calls for event tracing by a data center. The event tracing can be used to collect information as to performance of the external application 625 (which may be hosted by the data center) to determine whether one or more terms of the SLA are met (i.e., to determine if the actual level of service provided meets a service level specified in the service level agreement).

The component 623 generates a graphic for transmission to the client-side component 621 of a user's device. In addition, it provides for insertion of an advertisement in the generated graphic. As described herein, the PMAL.Advertising reference of the code 620 may cause the PMAL 655 to associate the component 623 with an advertising placement service. Hence, during execution of the code 620 in response to a request by a user, the PMAL 655 ensures that an advertisement is received by the component 623.

With respect to generation of a graphic, the component 623 requires a certain amount of memory and CPU resources. To assist the PMAL 655 in managing and assigning resources to the application component 623, the code 620 references a PAML.Mem class and a PMAL.CPU class associated with one or more memory and CPU intensive statements (e.g., "generate bitmap").

While conventional techniques exist to analyze application code to determine the amount of resources required for execution, such post hoc techniques can be cumbersome to implement. Instead, the resources classes referenced in the component 623 can affirmatively direct the PMAL 655 to assign resources at an approximate level, as estimated by the developer of the application code 620. In essence, this shifts the burden to the operator of the service (provided by the application code 620) whereby the operator states: "to perform this task, I would like about X memory and Y CPU resources". In turn, the PMAL 655 can assign resources in whatever manner it deems appropriate to manage the service operator's needs (e.g., with respect to users) and the operational needs of the data center (e.g., to optimize data center efficiency).

Given the code 620 and its resource references, the PMAL 655 may estimate a cost per request and transmit this estimate to a service operator that operates a service provided via execution of the application code 620. Such an approach facilitates data center management and can alleviate a need for negotiating resource costs and dedication of resources. Such an approach provides a business model for deploying, hosting and using services and can even integrate advertising and account for advertising revenue (e.g., payments to a service operator, hosting discounts for services that support ads, etc.).

Figure 7:
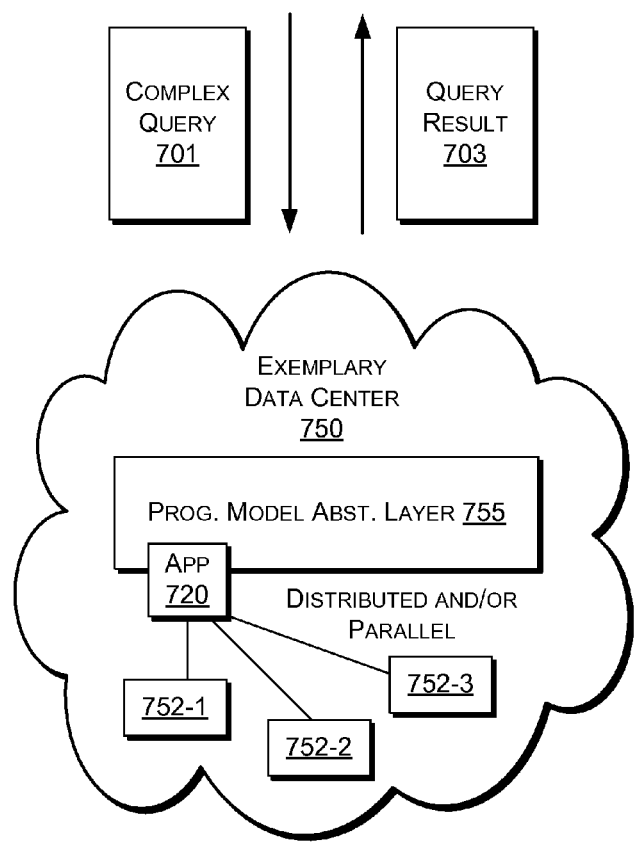
FIG. 7 is a block diagram of exemplary scheme where a programming model abstraction layer can distribute components and/or provide for execution of components in parallel, for example, based in part on statements or references in an application.

FIG. 7 shows an exemplary scenario where a complex query 701 is received by a data center 750 that hosts an application 720 to service such queries. In this example, the programming model abstraction layer 755 receives the query and determines that it can be satisfied by assigning the application resources 752-1, 752-2 and 752-3. For example, the programming model abstraction layer 755 may allow the application 720 to operate, at least in part, in parallel to expeditiously handle the complex query 701. In turn, the application 720 acts in a distributed manner to process portions of the query 701 and then to consolidate results to generate a query result 703. A developer of the application 720 may allow for such parallel processing by referencing one or more resource classes that direct the programming model abstraction layer 755 to assign resources in a manner that allows for parallel execution of at least some components of the application 720.

In the example of FIG. 7, a developer may reference certain classes with respect to inputs from a user of the application 720. For example, if X>3 (where X equals terms), then assign resources to execute multiple copies of a component of the application 720. As described herein, various opportunities exist to facilitate use of parallel processing. Such an approach can be advantageous to both a service operator and a data center operator as a data center operator typically wants to maintain full usage of available resources and doing so typically speeds service time. For example, where a window of opportunity exists, upon receipt of a user request, to use, say four available blades, then the data center should take full advantage this opportunity.

As described herein, an exemplary programming mode and associated programming model abstraction layer can act dynamically to enhance both user experience and data center performance and utilization. Conventional approaches are restrained when a service has dedicated resources, which are typically over specified. In turn, resources are often in-waiting. Costs associated with such conventional approaches are passed along to one or more parties—often in a manner that confounds solution. The exemplary approach described herein, consolidates various aspects of data center and service operation, which, in turn, facilitates synergistic solutions by making adjustments to the programming model and/or the programming model abstraction layer. As mentioned, such an approach can help decouple users and service operators from day-to-day data center infrastructure maintenance and upgrades.

Where a data center includes event tracing technology, information collected via event tracing can facilitate resource acquisition and de-acquisition (e.g., provisioning tasks). Further, event tracing can allow for more accurate cost assessments, benchmarking and decisions as to whether service level agreements are met.

While various examples are shown with respect to a single data center, a service operator may deploy applications to multiple data centers. As described herein, it is beneficial to the service operator and operator or operators of the multiple to rely on essentially the same programming model with appropriate variations occurring in the programming model abstraction layer to account for physical difference between the data centers. In such a manner, a developer is not burdened with differences between data centers.

For a service operator that intends to expand services via some interrelated applications or components, an exemplary programming model abstraction layer can facilitate the expansion as the overall approach is inherently more scalable than a conventional approach that requires negotiation for increase in resources, whether driven by an operator change to a service or by an increase in user demand for service(s).

Figure 8:
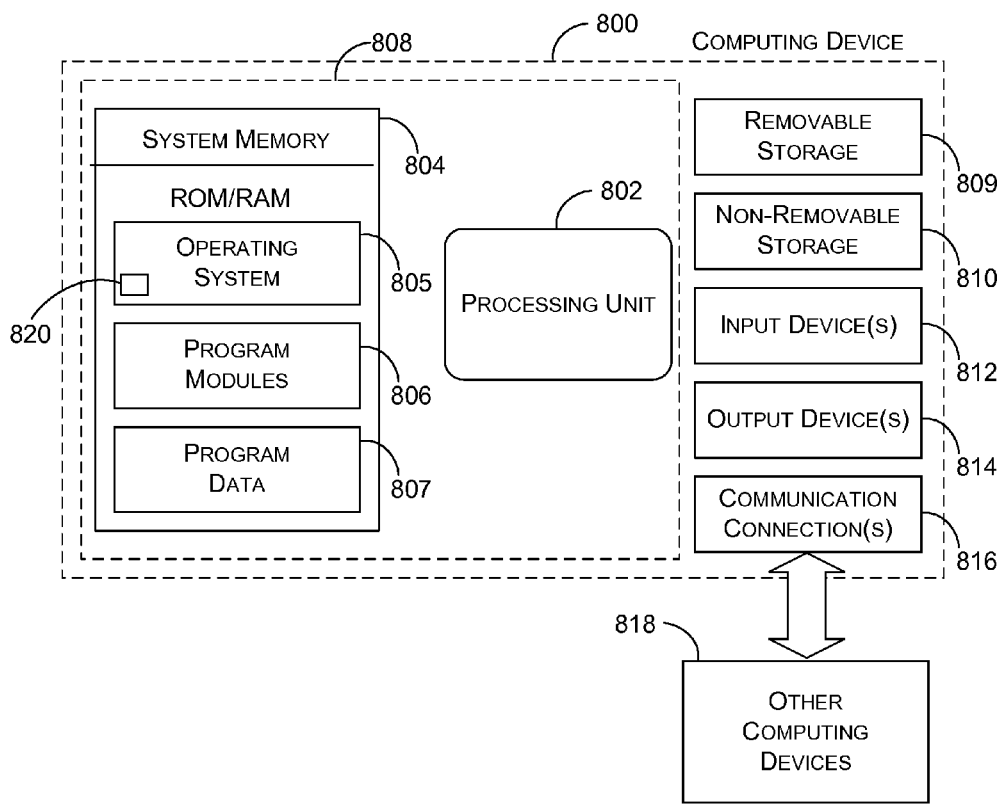
FIG. 8 is a block diagram of an exemplary computing device.

FIG. 8 illustrates an exemplary computing device 800 that may be used to implement various exemplary components and in forming an exemplary system. For example, computing devices of the data center 150 or 250 of FIG. 1 may include various features of the device 800.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. The operating system 805 include a component-based framework 820 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 800 is of a very basic configuration demarcated by a dashed line 808. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well know in the art and need not be discussed at length here.

Computing device 800 may also contain communication connections 816 that allow the device to communicate with other computing devices 818, such as over a network. Communication connections 816 are one example of communication media. Communication media may typically be embodied by computer readable instructions, data structures, program modules, etc. Communication may occur via wire (e.g., a wired network, a direct-wired connection, etc.) or wirelessly (e.g., acoustic, RF, infrared and other wireless transmission).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
    hosting a service at a data center, the service relying on at least one software component of the service developed according to a programming model and the data center comprising a corresponding programming model abstraction layer that abstracts resources of the data center such that resources may be assigned to the service based at least in part on a reference in the at least one software component to a resource class of the programming model, the reference to the resource class indicative of an abstract amount of resources;

receiving a request for the service; and in response to the request, assigning at least some of the resources of the data center to the service to allow for fulfilling the request wherein the programming model abstraction layer performs the assigning based in part on the abstract reference to the resource class in the at least one software component of the service, the resource class modifiable to account for changes in one or more resources of the data center.

2. The method of claim 1 wherein the resources of the data center comprise hardware resources.

3. The method of claim 1 wherein the resources of the data center comprise virtual resources that rely on hardware resources.

4. The method of claim 1 wherein the resource class comprises a processor resource class.

5. The method of claim 1 wherein the resource class comprises a memory resource class.

6. The method of claim 1 wherein the resource class comprises a bandwidth resource class.

7. The method of claim 1 wherein the assigning considers available resources in the data center, as of a time of receipt of the request.

8. The method of claim 1 wherein the request comprises a first request received at a first time and further comprising repeating the receiving for a second request received at a second time wherein the assigning assigns at least some resources to the first request and assigns at least some resources to the second request.

9. The method of claim 8 wherein at least some of the resources assigned in response to the first request differ from the resources assigned in response to the second request.

10. The method of claim 9 wherein the difference depends on resource utilization in the data center at the first time and at the second time.

11. The method of claim 10 wherein the difference comprises a difference in actual resources, virtual resources or actual and virtual resources.

12. The method of claim 1 further comprising modifying the resource class based on a change in a hardware resource of the data center.

13. The method of claim 12 wherein the at least one software component executes using in part the changed hardware resource without requiring any modifications to its code.

14. The method of claim 1 wherein the programming model and the programming model abstraction layer insulate the at least one software component from a change in number of servers in the data center.

15. The method of claim 1 wherein the programming model and the programming model abstraction layer insulate the at least one software component from a change in type of processors in the data center.

16. The method of claim 1 wherein the service relies on another service hosted by the data center.

17. The method of claim 16 wherein a service level agreement exists for the other service hosted by the data center.

18. The method of claim 17 further comprising performing event tracing during execution of the other service to collect information sufficient to determine if the other service complied with one or more terms of the service level agreement.

19. The method of claim 1 further comprising performing event tracing according to one or more statements in the at least one software component.

20. One or more computer readable storage devices storing instructions that when executed by one or more processors instruct the one or more processors to perform the operations of a service that comprises:

a programming model and a corresponding programming model abstraction layer for implementation by a data center; and a service developed according to the programming model and hosted by the data center wherein the programming model abstraction layer assigns at least some resources of the data center to the service in response to a request for the service and based in part on reference to a resource class in at least one software component of the service, the resource class of the programming model abstracting resources of the data center and modifiable to account for changes in one or more resources of the data center, the reference to the resource class indicative of an abstract amount of resources.

21. A method comprising:

providing a resource class of a programming model for use in assigning a type of physical resource to a service hosted by a data center in response to a request for the service, the resource class of the programming model abstracting resources of the data center;

executing a software component of the service, the software component including a reference to the resource class, the execution using the type of physical resource, the reference to the resource class indicative of an abstract amount of resources;

changing a characteristic of the type of physical resource;

modifying the resource class; and executing the software component using the changed type of physical resource wherein the modifying the resource class insulates the software component from the changing.

* * * * *